United States Patent [19]

Bray

[11] 4,222,092

[45] Sep. 9, 1980

[54] ACCESSORY LIGHT COVER

[76] Inventor: Richard L. Bray, 213 St. Peter Ave., Biloxi, Miss. 39531

[21] Appl. No.: 3,946

[22] Filed: Jan. 16, 1979

[51] Int. Cl.³ .............................................. B60Q 1/00
[52] U.S. Cl. ...................................... 362/80; 362/82; 362/376
[58] Field of Search ........................... 362/82, 80, 376

[56] References Cited
U.S. PATENT DOCUMENTS

3,449,559  6/1969  Licata et al. ......................... 362/317

Primary Examiner—Stephen J. Lechert, Jr.
Attorney, Agent, or Firm—Armstrong, Nikaido, Marmelstein & Kubovcik

[57] ABSTRACT

A movable protective shield which covers accessory lights on an automobile while in a closed position, and which can be moved to an open position to un-shield the accessory lights, thus permitting their use. The device is comprised of a U-shaped frame member which may be attached to the front bumper of an automobile at a single connection point, a lever arm pivotally connected to the frame, a shield plate pivotally connected to the other end of the lever arm and a cable connected at one end to the plate and extending into the passenger compartment of the automobile at its other end. The device is operated by pulling the cable within the passenger compartment, which causes the top of the plate to tilt downwardly and backwards toward the light, while pivoting on the lever arm. The bottom of the plate pivots upward and outward away from the light, until the plate lies horizontal and is pulled within the U-frame and away from being in front of the light.

5 Claims, 13 Drawing Figures

ACCESSORY LIGHT COVER

BACKGROUND OF THE INVENTION (1) Field of the Invention

This device relates to the field of automobile accessories and, more particularly, to devices which shield the accessory lights on an automobile and which can be manipulated from inside of the vehicle to allow use of the lights, and which also may be simply connected to the automobile at a single point.

(2) Description of the Prior Art

Various devices exist in the prior art which cover the conventional headlamps on automobiles. However, the prior art does not disclose the basic concept of utilizing a movable protective shield on the accessory lights of an automobile. Furthermore, the devices disclosed in the prior art are not adaptable for use on accessory lights due to the different positioning and the intended use of accessory lights.

Conventional headlights are held within the fender of an automobile at a point somewhat above the lower frame of the vehicle. Due to the position of conventional headlights, the prior art shielding devices are constructed so as to be secured to the structure on either side, above, below and behind the light. Furthermore, since conventional headlights serve to light the area directly in front of the automobile (as opposed to an area off to the side, in front of the vehicle), the prior art devices contained structural elements which did not obstruct light which shone straight-ahead but would, instead, obstruct laterally-flowing light.

Thus, prior art devices are constructed so that they are not able to be secured to an automobile to shield downwardly-extending accessory lights due to insufficient structural support for securing the device. Notwithstanding the deficiency of the means of attachment, the prior art devices extend too far below the accessory lights to allow for sufficient clearance and contain structural elements which can be easily damaged.

Disclosure of prior art devices is contained in U.S. Patent Nos. 3,449,559; 2,388,787; 2,347,085 and 2,360,461. None of these disclosed devices are shown as being used in combination with an accessory automobile light, and none of these devices may be simply and quickly connected to an automobile at a single connection point.

U.S. Pat. No. 3,449,559 shows a movable light shield having curved shield numbers, pivot mechanisms below the light, and a power source and its linkage also being located below the lights. Although these features are suitable for use on conventional automobile lights, they cause the device to be unadaptable for use on accessory automobile lights.

The other cited patents contain similar features which also make them unadaptable for use with accessory lights. The device of U.S. Pat. No. 2,388,787 cannot be adapted for use on accessory lights due to the positioning of the power mechanism below the light, in addition to which the device of this patent requires a lateral support structure for the lever mechanisms.

The device of U.S. Pat. No. 2,347,085 is not adaptable due to the presence of the side plates, which would direct the light forward and block its lateral flow, and also due to the positioning of the pivot point below the light. The device of U.S. Pat. No. 2,360,461 cannot be adapted for use with accessory automobile lights because of its requirement of a lateral support structure for the linkage mechanism.

There are other reasons why the devices of the cited patents and other prior art devices are not adaptable for use in combination with downwardly-extending accessory lights. The prior art devices are not possessed of simple sturdy structure, great adaptability for use with different types of automobiles and lights, or the smoothness of operation which characterizes the present invention. Furthermore, there are no prior art devices connectable to an automobile at a single point, which point may also be the connection point of the light to the shielding device.

SUMMARY OF THE INVENTION

A movable accessory-light cover mechanism is disclosed herein. This device is comprised of a frame connectable to an automobile at a single point, a lever arm, a cover shield and a means for moving the cover shield. The frame is a U-shaped band of sturdy metal having a hole in its center through which a bolt may be placed to connect the frame to the automobile in such a manner that the open end of the U-shaped frame points downward with the frame surrounding the accessory light which is to be shielded.

A U-shaped lever means, slightly smaller than the frame, is connected to each end of the frame at pivot points. The ends of the lever are pivotally connected to brackets which extend perpendicularly outward from the cover shield plate. A cable is connected at one end to the top edge of the plate, with the other end extending into the passenger compartment of the automobile. The cable may be pulled manually, or it may be connected to a power actuating means of some type.

Due to the structure of the device, its connection to the automobile and its operation are simple. The device can be used, for example, as a cover for downwardly-extending accessory fog-lights and may even be produced in combination with such a light. In order to facilitate connection, the device is assembled prior to attempting to position the device on an automobile, with the possible exception of the cable remaining disconnected until after the device has been connected to the automobile. Fog-lights are often connected to the front bumper of an automobile via a bracket which is bolted to the bumper. Therefore, it is often possible to bolt the frame of the device to the bumper using the same bolt which holds the fog-light bracket.

The U-frame should be connected to the bumper or other suitable structure on the automobile directly over the light which is to be protected. Connection is made by positioning the hole in the U-frame beneath a hole in the bumper, and then passing a bolt through the bumper and frame and then tightening a nut thereon.

Once the U-frame is secured to the automobile, the cable is connected at one end to the upper edge of the cover plate; the other end of the cable being connected to a power actuating means or being connected to a knob inside the passenger compartment of the automobile, where it can be operated manually.

When the cable is pulled, the top edge of the cover plate tilts backwards and, simultaneously, the bottom edge of the plate tilts up and forward. Tilting is possible because the plate is held by two brackets which are pivotally connected to a U-shaped lever mechanism which is, in turn, pivotally connected to the frame. As the cable is pulled back further, the plate attains a horizontal position. A locking mechanism on the frame or cable then holds the plate in this horizontal, up-position so that the light may be used.

In accordance with the above-described structure and operation, it is the primary object of this invention to provide a movable shield for accessory vehicle lights.

Another object is to provide such a shield which can be secured to the vehicle at a single point directly above a light.

Still another object is to provide such a shield to be connected at a single point, which point is the connection point of the light which it is to shield.

Still a further object is to provide such a shield which can be positioned for use on accessory lights without having any part of its structure extend below the light.

Yet another object of this invention is to provide a shield which may be easily connected to a vehicle.

Another object is to provide a shield which has a sturdy, simple construction.

Another object is to provide a shield which can be easily and inexpensively manufactured.

Still another object of the invention is to provide a shield which adds to the esthetic appearance of the automobile.

A still further object is to provide a shield which lies close to the light which it protects, and which gives maximum protection to the light from foreign objects.

Another object is to provide a shield which allows for unobstructed downward, lateral and forward-flow of light when it is in the open position.

Another object of this invention is to provide a shield which has a smooth, easy opening and closing action.

These, together with other objects and advantages, will become more apparent to those skilled in the art upon reading the details of construction and operation as more fully set forth hereinafter, reference being made to the accompanying drawings wherein like numerical designations indicate identical, or similar parts, throughout the plurality of views which are presented.

DETAILED DESCRIPTION OF THE PREFERRED EMBODIMENTS OF THE INVENTION

Figure 1:
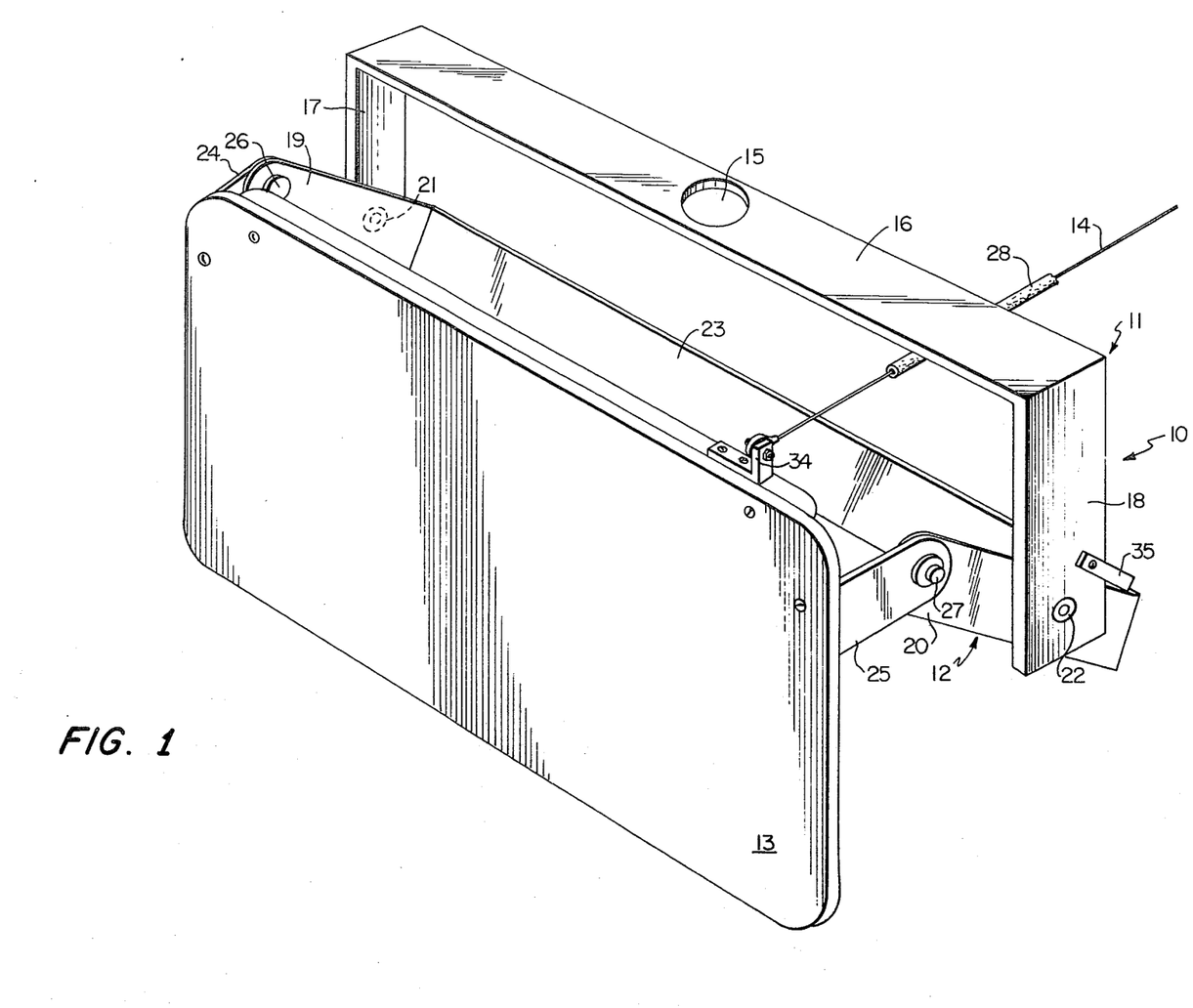
FIG. 1 is a perspective view of the present invention showing the front, side and top.

Referring to the drawings, and to FIG. 1 in particular, is shown a perspective view of the device referred to generally by the numerical designation "10". The accessory light cover shield 10 is comprised of a U-shaped frame 11, a U-shaped lever mechanism 12, a cover plate 13 and a cable 14.

The frame 11 has a hole 15 in the main support bar 16 and has two bars 17 and 18, which are the arms of the "U", extending perpendicularly downward from the bar 16. The lever 12 has two perpendicularly extending arms 19 and 20 which are pivotally connected to bars 17 and 18 by pins 21 and 22, respectively, which may be rivets, bolts, etc. The arms 19 and 20 may be interconnected by structural support bar 23. The arms 19 and 20 are, respectively, connected to brackets 24 and 25 at pivot points 26 and 27. The brackets 24 and 25 are attached to plate 13 so that they extend perpendicularly outward from the back of plate 13 near the top of the plate. A cable 14, which has been enclosed in tubular cover 28, is connected to plate 13 on or near its top edge.

Figure 2A:
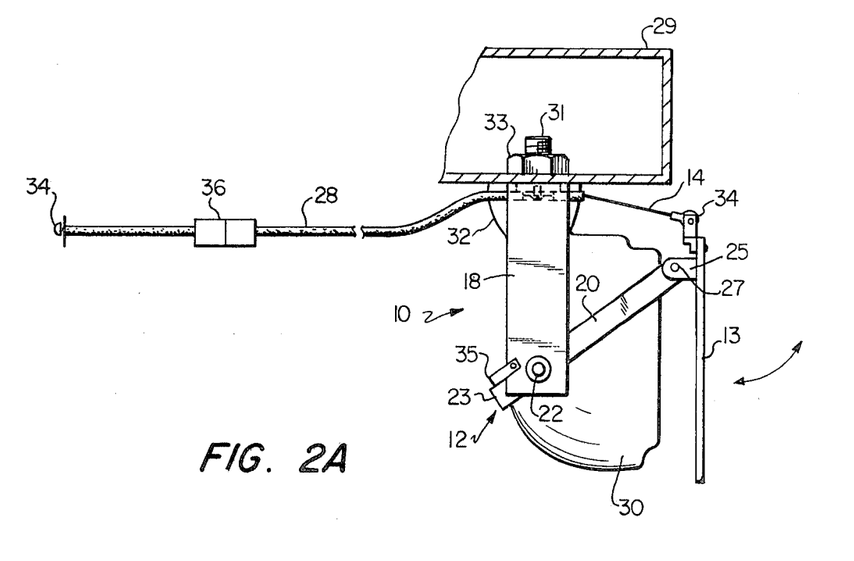
FIG. 2A is a side view thereof, showing the shield in the vertical, covering position.
Figure 2B:
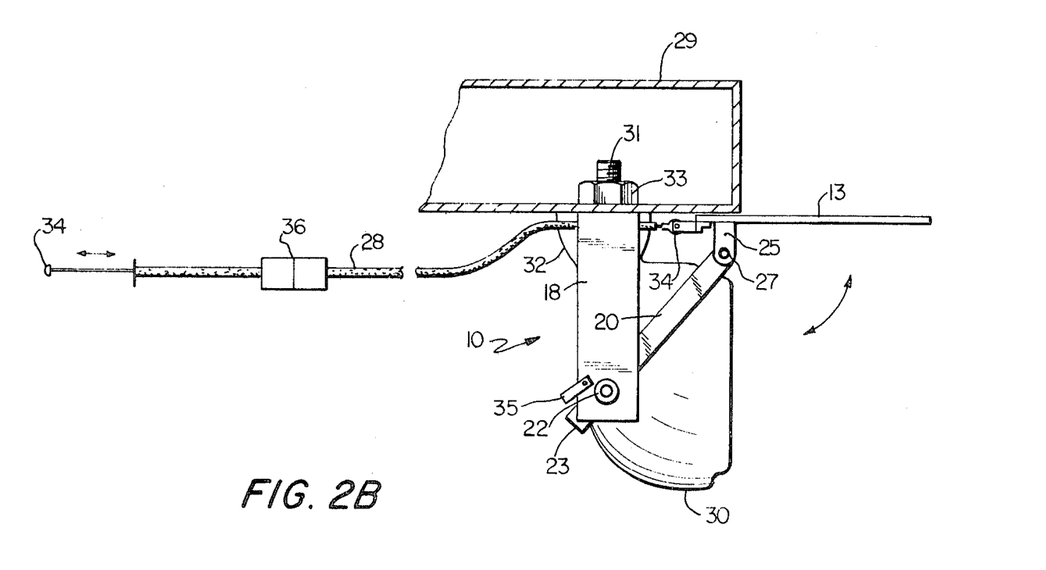
FIG. 2B is a side view of the present invention showing the shield in a horizontal, up-position.

FIGS. 2A and 2B are now referred to in order to specifically describe how the device 10 is connected to an automobile and how it operates.

FIG. 2A shows a side view of the device 10 attached to a bumper 29 above accessory fog-light 30. A bolt 31 has been passed through the hole 15 in the U-frame, a hole (not shown) in bracket 32 (which is connected to light 30), and through a hole (not shown) in bumper 29. A nut 33 is then tightened onto the bolt 31. The cable 14 is then connected at point 34 by any suitable, commonly known means. A light 30 may already be connected to frame 12 prior to the frame 12 being connected to the car.

In FIG. 2A, the cover plate 13 is in a vertical, down position. While in this position, the plate 13 covers light 30 and protects it from foreign objects. Due to the construction of device 10, the plate 13 lies very close to light 30, thus offering maximum protection.

In FIG. 2B, the cover plate 13 is in a horizontal up-position. The plate 13 is moved to this up-position by pulling back on knob 34, which is connected to cable 14. As the knob 34 is pulled backward, the top edge of plate 13 is tilted backwards, with the bottom edge of the plate tilting upward and outward as the plate pivots on pivot points 26 and 27. When the plate 13 is fully up, the light 30 may be used and light may flow unobstructed either forward, laterally or downwardly.

It should be noted that a locking pin 35 may be connected to arm 18 so that U-shaped lever 12 will not pivot downward any further than is illustrated in FIG. 2A.

Figure 3:
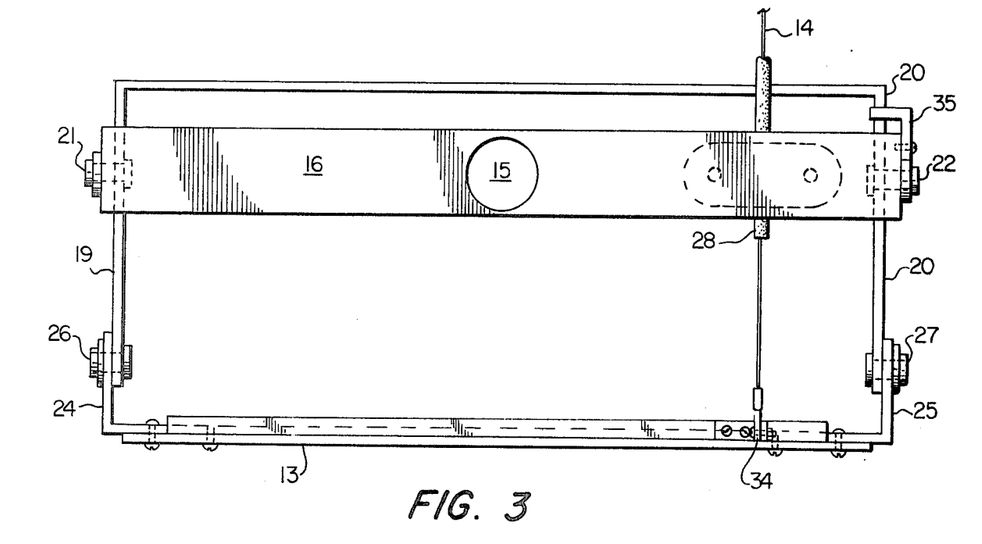
FIG. 3 is a top view of the present invention showing the shield in the vertical, covering position.
Figure 4:
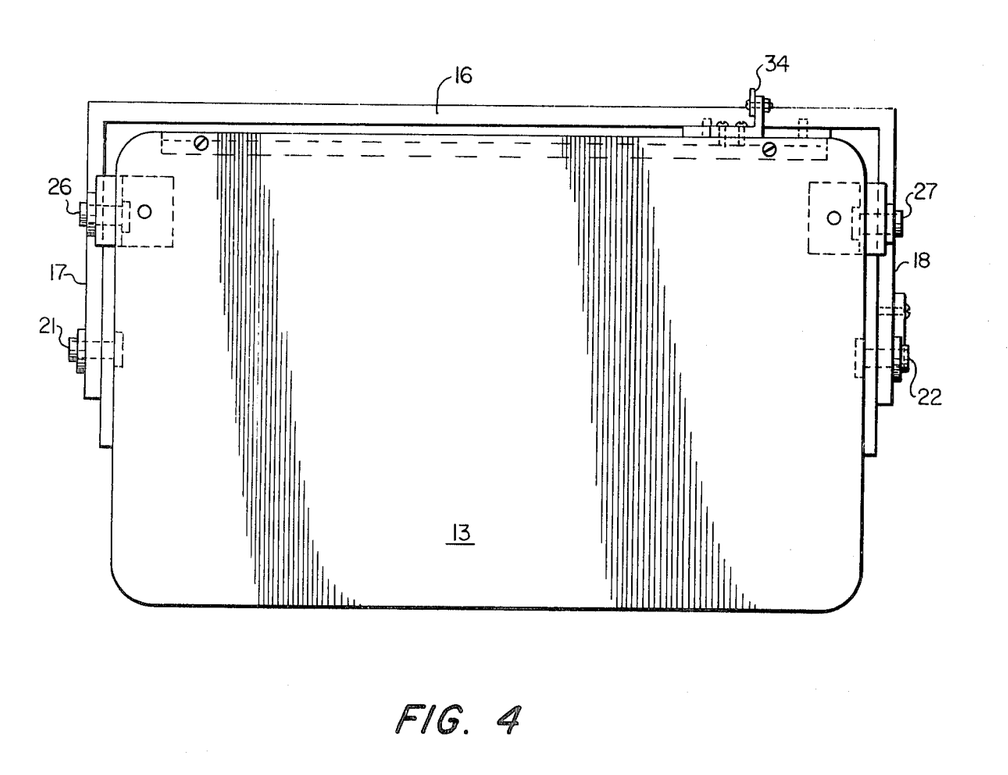
FIG. 4 is a front view of the present invention showing the shield in the vertical, covering position.

Referring now to FIGS. 3 and 4, there is shown a plan and front view, respectively, of the device 10. Both Figures show the plate 13 in a vertical, down position with the device 10 not connected to an automobile.

Figure 5:
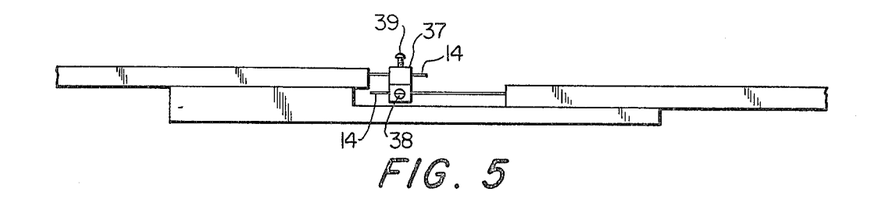
FIG. 5 is a top view of the cable and cable adjustment mechanism of the present invention.
Figure 6:
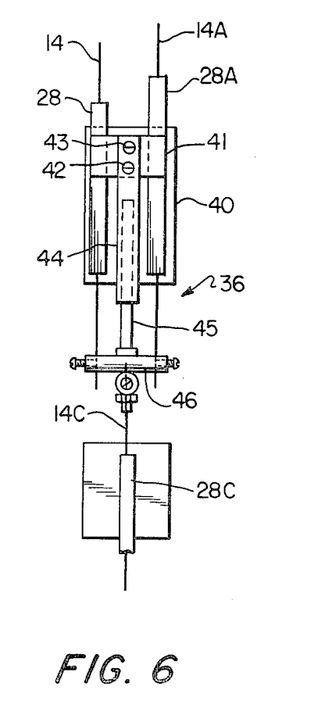
FIG. 6 is a top view of the cables and cable linkage mechanism of the present invention.
Figure 7:
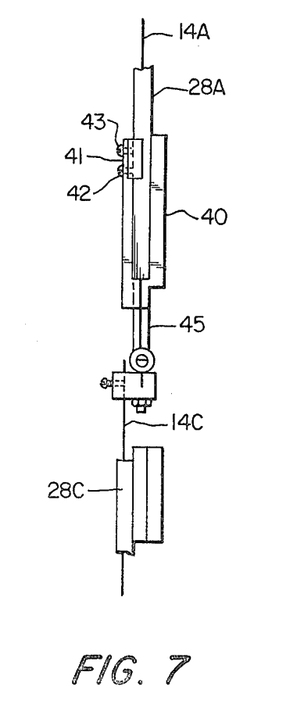
FIG. 7 is a side view of the cables and cable linkage mechanism of the present invention.

Referring now to FIGS. 5, 6 and 7, there is shown the cable linkage system 36.

FIG. 5 is a side view of tension adjustment mechanism 37. The screws 38 and 39 are loosened and the cables 14 are pulled tight, with screws 38 and 39 being re-tightened to add tension to the cables.

FIG. 6 is a top plan view of the linkage mechanism 36 and FIG. 7 is a side view thereof. Cables 14 and 14A each run to a device 10 which covers a light 30. Each of the cables 14 and 14A run through cover tubes 28 and 28A. The tubes 28 and 28A are held in a holding block 40 and are held tightly in place by cover clamp 41 and screws 42 and 43. The block 40 has a cylindrical opening 44 which holds rod 45. The rod 45 is connected to cross-rod 46, which also holds cables 14 and 14A. The rods 45 and 46 add to the structural integrity of the linkage mechanism and allow for smooth, simultaneous operation of both light covers. A cable 14C in tube 28C is connected to rod 46. The cable 14C extends into the passenger compartment of a vehicle (not shown) and is connected to a knob 34, which is shown in FIGS. 2A and 2B. Thus, the device 10 which covers each light 30 can be manually activated. Alternatively, the cable 14C may be connected to a power-actuation device such as the devices which are shown in FIGS. 8, 9, 10 and 11.

Figure 8:
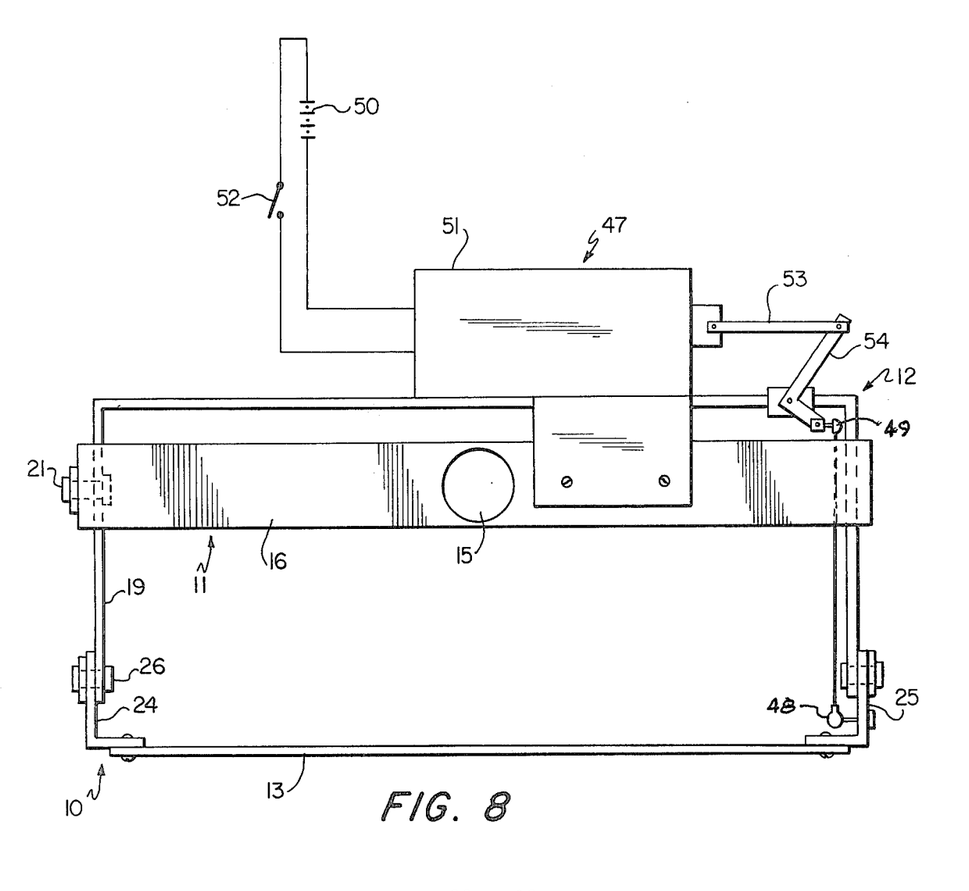
FIG. 8 is a top view of the present invention showing a first embodiment of the power-actuating element.

Referring now to FIG. 8, there is shown a top view of the device 10 showing an electrical solenoid actuating mechanism 47 attached thereto. A slight variation of the device 10 is necessary for the practical implementation of the solenoid system 47. The U-shaped lever 12 is made stationary and is located higher up on frame 11. The cable 14 is positioned on the bracket 25. These alternations shorten the length of pull which is necessary to move the cover plate 13.

The cable connection 48 swivels and connection 49 has a double swivel action. A 12-volt power source 50, such as a car battery, is connected to the spring-loaded solenoid 51. When the switch 52 is closed, the solenoid 51 pulls arm 53 inward and causes the angle connection 54 to rotate, thus pulling the cable. The cable pulls the front plate 13 up, which uncovers the light. When the switch 52 is opened, the spring (not shown) in the solenoid 51 pushes the solenoid, thus forcing the cover 13 into its down, or closed, position. The switch mechanism 52 is, of course, located in the passenger compartment of the vehicle.

Figure 9:
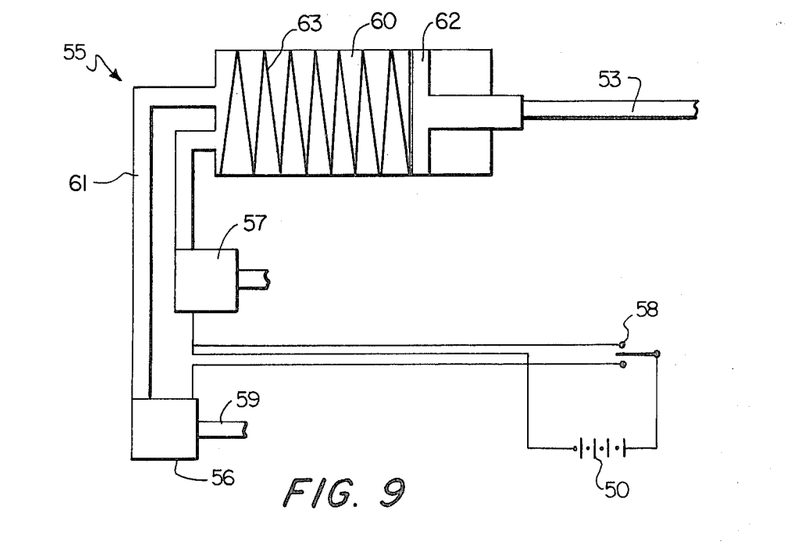
FIG. 9 is a schematic view of a second embodiment of the power-actuating element.

FIG. 9 illustrates a schematic view of a vacuum-powered, actuating mechanism 55 which is adaptable to the modified device of FIG. 8. A 12-volt power source 50 is connected to electrical vacuum valve 56 and 57, which may be electrically connected to the power source 50 by switch 58. When switch 58 is closed, power is applied to valve 56. Thus line 59, which is connected to a vacuum source on the engine manifold, is connected with cylinder 60 via line 61. The piston 62 is pulled backward, which pulls rod 53 back and lifts the cover 13 in the same manner as was described above with respect to solenoid mechanism 47. When switch 58 is turned on, power is applied to the valve 57, and the vaccuum in line 59 is shut off, since power is no longer applied to valve 56 to open it. Valve 57 is opened, which releases the vacuum in cylinder 60 and allows the spring 63 to force the piston 62 back, thus lowering cover 13. It should be noted that the valves 56 and 57 may be manually operated.

Figure 10:
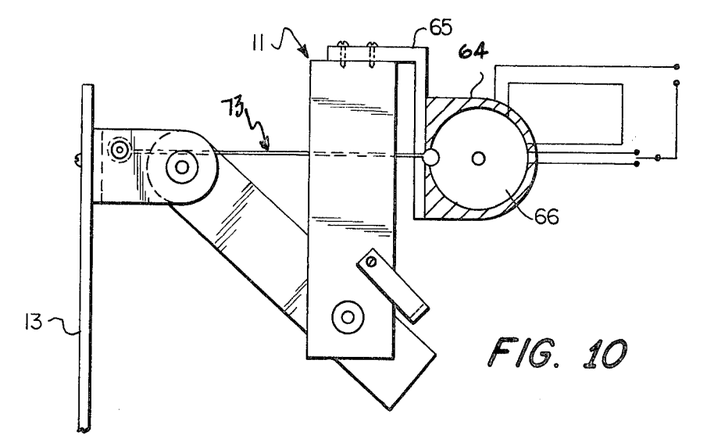
FIG. 10 is a side view of the present invention showing a third embodiment of the power-actuating element.
Figure 11:
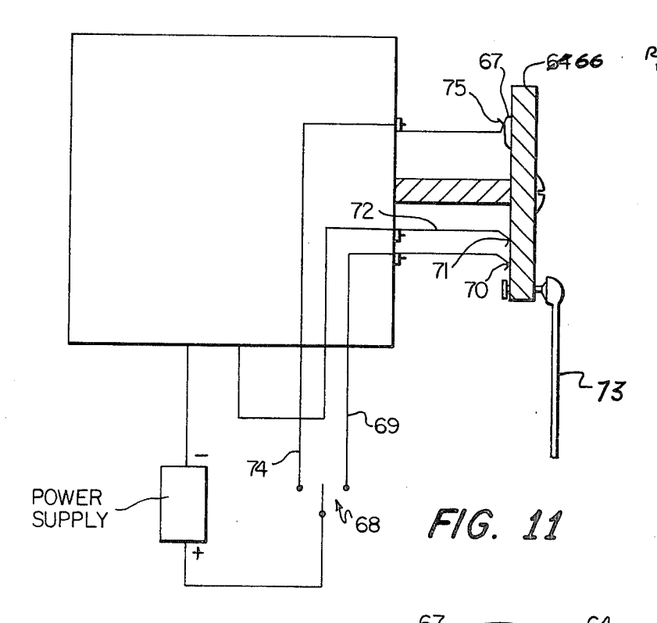
FIG. 11 is a schematic view of the electric motor actuating element of FIG. 10.
Figure 12:
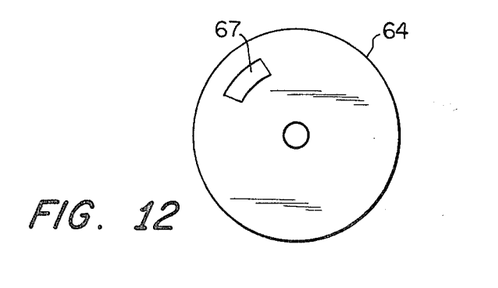
FIG. 12 is a front view of the contact wheel of the electric motor actuating element of FIG. 10.

FIGS. 10, 11 and 12 are now referred to in order to describe an electric motor-type of movement means. Electric motor 64 is attached to frame 11 via bracket 65. The motor 64 has a wheel 66 thereon which has an electrically conductive surface, with the exception of strip 67. By turning switch 68 to contact wire 69, the current flows through wire 69 to brush 70 through wheel 64 to brush 71, which is always in contact with the wheel, and thus wire 72 is grounded. When the circuit is complete, the wheel turns one-half turn, until the circuit is broken by the brush 70 contacting pad 67.

The rotation of wheel 66, one-half revolution, causes the rod 73 to be pulled back a distance equal to the diameter of the wheel 66. Thus, the cover 13 is raised.

In order to lower cover 13, the switch 68 is connected to wire 74. The current flows through line 74 to brush 75 and through the disc 64 to brush 71 to wire 72, thus completing the circuit. The wheel 64 will rotate one-half turn until the pad 67 interrupts the circuit.

The instant invention has been shown and described herein in what is considered to be the most practical and preferred embodiments. It is recognized, however, that departures may be made from this invention within the scope thereof and that obvious modifications will occur to a person skilled in the art.

What is claimed:

1. A movable protective-shield covering for accessory lights on vehicles, said covering comprising:
   a U-shaped frame member connectable to said vehicle at a single point above said accessory lights on said vehicle so that said U-shaped frame member partially surrounds said light;
   a U-shaped lever arm pivotally connected to said U-shaped frame at two points;
   a light cover plate member pivotally connected to said lever arm member at two points so as to allow said plate to pivot from a vertical to a horizontal position for covering and uncovering said light; and
   a cable means for moving said cover plate from said vertical to said horizontal position, said cable means connected at a first end to said cover plate at a point such that said cover plate may be pivoted about said pivotally connected points.

2. A device as in claim 1 further including an electric motor wherein said cable is connected at a second end to said electric motor.

3. A device as in claim 2, further including:
   first and second brackets which are connected at one end and extend perpendicularly from said cover plate, said brackets being connected pivotally at their other end to said lever arm; and
   a locking pin pivotally connected to said frame member and extending beyond the edge of said frame member so as to prevent movement of said lever arms beyond a point.

4. A movable protective shield covering for accessory lights on vehicles, said covering comprising:
   a U-shaped frame member connectable to said vehicle at a single point above said accessory lights on said vehicle so that said U-shaped frame member partially surrounds said light;
   a U-shaped lever arm pivotally connected to said frame at two points;
   a light cover plate member pivotally connected to said lever arm at two points so as to allow said plate to pivot from a vertical to a horizontal position for covering and uncovering said light;
   a rod means for moving said cover plate from said vertical to said horizontal position, said rod means connected at a first end to said cover plate at a point such that said cover plate may be pivoted about said pivotally connected points; and
   an electric solenoid connected to said rod at the other end thereof.

5. A movable protective shield covering for accessory lights on vehicles, said covering comprising:
   a U-shaped frame member connectable to said vehicle at a single point above said accessory lights on said vehicle so that said U-shaped frame member partially surrounds said light;

a U-shaped lever arm pivotally connected to said frame at two points;

a light cover plate member pivotally connected to said lever arm member at two points so as to allow said plate to pivot from a vertical to a horizontal position for covering and uncovering said light; and a piston cylinder vacuum-powered moving means for moving said cover plate from said vertical to said horizontal position, said piston cylinder vacuum-powered moving means connected to said cover plate at a point such that said cover plate may be pivoted about said pivotally-connected points.

* * * * *